Figure 4:
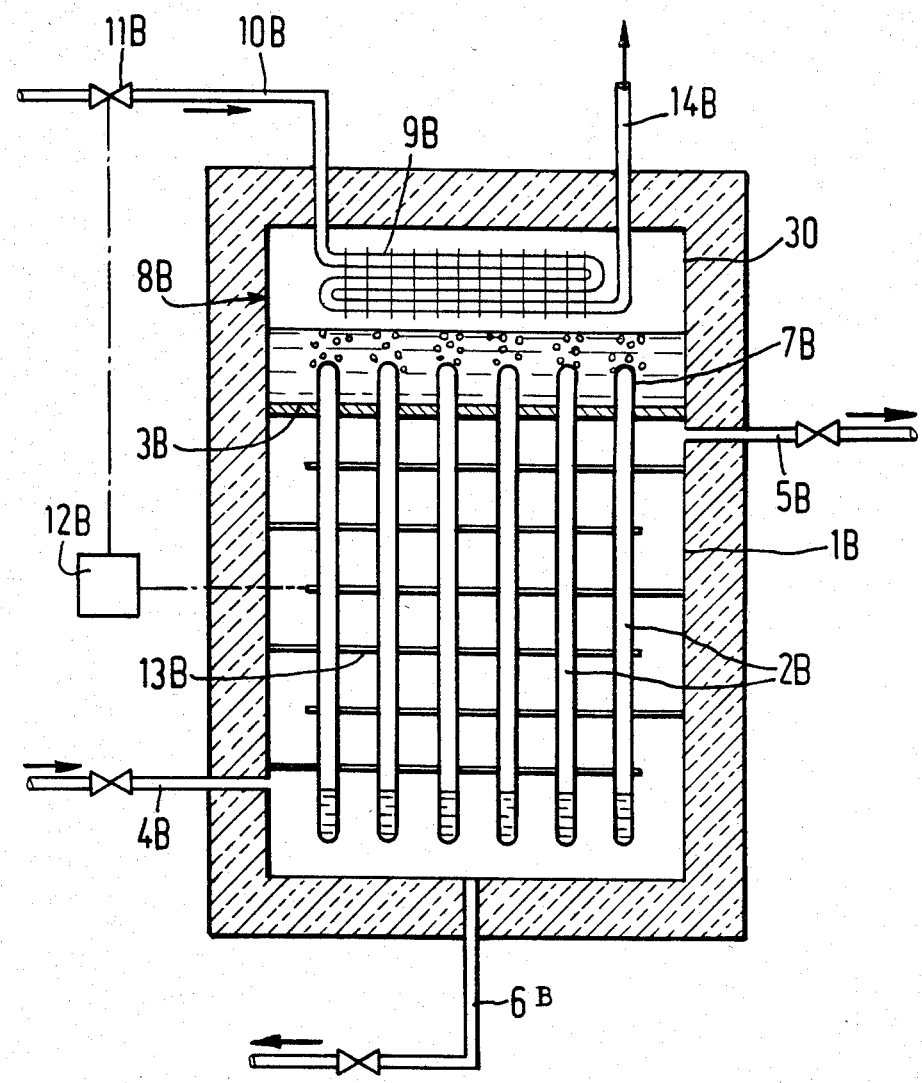

United States Patent [19]

Le Diouron

[11] Patent Number: 4,538,423

[45] Date of Patent: Sep. 3, 1985

[54] COOLING APPARATUS AND COOLING TRAP INCLUDING SUCH AN APPARATUS

[75] Inventor: Raymond Le Diouron, Voiron, France

[73] Assignee: L'Air Liquide, Societe Anonyme pour l'Etude et l'Exploitation des Procedes Georges Claude, Paris, France

[21] Appl. No.: 606,516

[22] Filed: May 3, 1984

[30] Foreign Application Priority Data

May 5, 1983 [FR] France .................................. 83 07498

[51] Int. Cl.³ ............................................. F25B 41/04
[52] U.S. Cl. ...................................... 62/222; 62/55.5; 62/119; 62/514 R; 55/269; 165/104.21
[58] Field of Search ................ 62/55.5, 100, 119, 268, 62/514 R, 383, 222; 165/104.21; 55/269

[56] References Cited

U.S. PATENT DOCUMENTS 4,030,900 6/1977 Van Litsenburg ............... 62/514 R

Primary Examiner—Ronald C. Capossela
Attorney, Agent, or Firm—Young & Thompson

[57] ABSTRACT

The region 1 to be cooled contains the evaporator of a heat pipe 2 which contains a diphase fluid adapted to the desired temperature between about 0° and −100° C. The condenser 7 of the heat pipe is cooled to a set temperature by a copper ring 8 which is cooled by a regulated liquid nitrogen current. Applications in the freeze trapping of solvents contained in a gaseous current.

14 Claims, 4 Drawing Figures

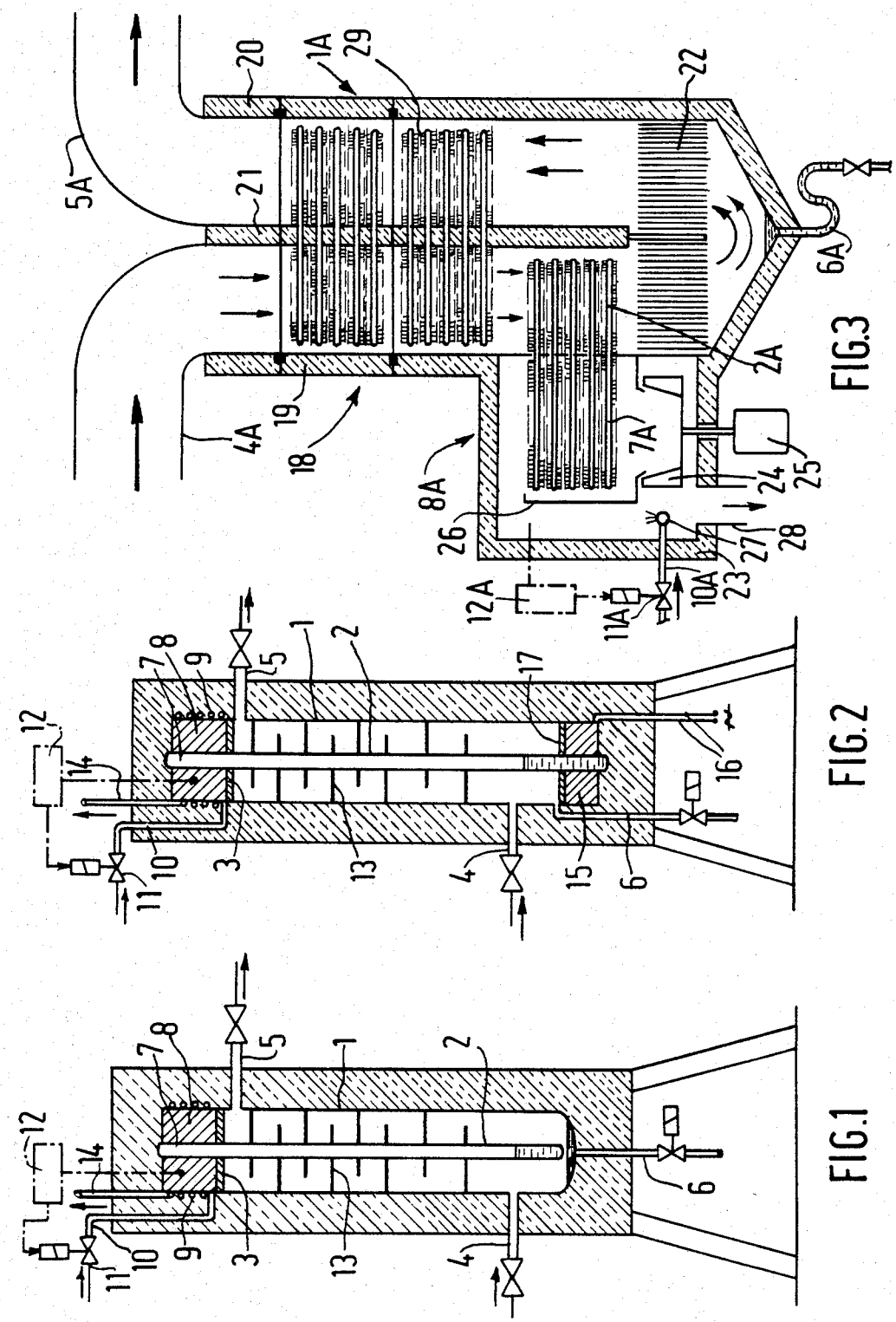

COOLING APPARATUS AND COOLING TRAP INCLUDING SUCH AN APPARATUS

The present invention relates to the technique of cooling by means of a cryogenic agent in the range of temperatures between ambient temperature and the temperature of this agent, and its application to the trapping of certain components of a mixture of fluids. The invention is in particular applicable to cooling by means of liquid nitrogen in the temperature range of between 0° and about −100° C.

Liquid nitrogen is available at a very low temperature which is −196° C. at atmospheric pressure. Consequently it can only be used indirectly for cooling a given region in the temperature range of between 0° and about −100° C. Current techniques comprise either spraying liquid nitrogen in a tunnel or in a container where gas at a regulated temperature is subjected to a forced circulation, or circulating a heat-carrying liquid between the region to be cooled and a heat exchanger fed with liquid nitrogen.

These known techniques employ relatively costly devices (pumps, fans) which are justified when the cooling powers required are considerable, but there is a need for more economical apparatus for moderate cooling powers, in particular in many cases of gas purification.

An object of the invention is to satisfy this need. The invention therefore provides an apparatus for cooling by means of a cryogenic agent a given region to a temperature between ambient temperature and the temperature of said agent, said apparatus comprising a heat pipe whose evaporator is disposed in said region and whose condenser is a heat-exchange relation with an isothermal device maintained at a set or reference temperature by a regulated current of liquid hydrogen, said heat pipe containing a fluid whose boiling domain extends on each side of said set temperature.

In the present specification, "heat pipe" is intended to mean any heat transfer device comprising a sealed container which contains a diphase fluid and which has a vaporization zone termed on evaporator, a condensation zone termed a condenser and, optionally, an intermediate adiabatic zone.

Another object of the invention is to provide a cooling trap for a mixture of fluids comprising a container for circulating the mixture to be purified and provided with a cooling apparatus such as defined hereinbefore.

In an advantageous embodiment, the container has an elongate shape and the evaporator of the heat pipe is formed by a tube which extends throughout the length of the container inside the latter.

When the trapping results in the formation of a solid deposit, as is the case in operations for dehydrating a gas, the tube is provided with heating means which very conveniently effect the regeneration.

Several embodiments of the invention will now be described with reference to the accompanying drawings in which FIGS. 1 to 4 respectively represent four embodiments according to the invention.

The cooling apparatus shown in FIG. 1 is adapted to eliminate from a gas mixture one or more distinctly less volatile components, for example for recovering a costly and/or polluting solvent contained in a gas. It essentially comprises a container 1 provided with a heat pipe 2.

The container 1 is cylindrical, has a vertical axis and is defined in its upper part by a horizontal plate 3. It has in its lower region an inlet conduit 4 for the gas to be treated and in its upper region an outlet conduit 5 for the purified gas. A purge conduit 6 extends from the lower point of this container, the conduits 4 to 6 being provided with suitable valves.

The heat pipe 2 is a metal tube which extends along the axis of the container 1. This tube is closed at each end and extends from the vicinity of the lower point of the container through a central opening of the plate 3, this tube being connected to, and extending a short distance above, the plate 3. Welded to the end portion 7 of the tube 2 located above the plate 3 is a massive copper ring 8. Brazed to the latter is a helically coiled tube 9 connected to a conduit 10 supplying liquid nitrogen and provided with an electrically operated valve 11. The latter is controlled by a temperature probe 12 adapted to measure permanently the temperature of the ring 8.

The tube 2 contains a diphase fluid which is such that the temperature at which the gas must be treated is within the middle region of the boiling domain of this fluid. In other words, the treating temperature, which is so chosen that the saturated vapor pressure of the component or components to be eliminated is negligible, must be remote from both the triple point and the critical point of said fluid. By way of example, there may be chosen as said fluid the fluid known under the trade name "Freon R 22" for treatment temperatures of the order of 0° to −50° C., or ethylene for treatment temperatures between about −50° and −100° C. The latter case corresponds for example to the extraction of the solvent $C_2H_5OH$ from a nitrogen current, which extraction can be effected in the neighborhood of −85° C.

Throughout its part contained in the container 1, i.e. in the evaporator of the heat pipe, the tube 2 is provided with horizontal metal fins 13. These fins are horizontally offset from each other so as to constitute a series of baffles which define between the inlet 4 and the outlet 5 a sinuous path for the gas to be treated.

The assembly comprising the container 1, the heat pipe 2, the ring 8 and the coiled tube 9 is surrounded with a suitable heat insulation.

In operation, the electrically operated valve 11 is opened under the control of the temperature probe 12 so as to bring and then maintain the copper ring 8 at a constant temperature which is a few degrees lower than the treatment temperature of the gas, so as to take into account the imperfection in the heat exchanges. Owing to the very high thermal conductivity of the heat pipe 2 (this conductivity is of the order of a few 10 times that of the copper), the whole of the heat pipe is put into equilibrium at this temperature. The nitrogen vaporized in the coiled tube 9 is discharged through a conduit 14.

When the thermal equilibrium is reached, the valves of the conduits 4 and 5 are opened so as to cause the gas to be treated to circulate in the container 1. As the entering gas is relatively warm (for example at ambient temperature), it imparts heat to the part of the tube 2 contained in the container 1 and in particular to its lower part containing the liquid. At the same time, the liquid nitrogen cools the upper end of the tube 2 through the ring 8. Consequently, the liquid boils at the base of the heat pipe and the vapor in the upper part of this heat pipe condenses in its condensor 7. The condensation produces a suction of the vapor in the upward direction and the liquid thus formed redescends under the effect of gravity.

So long as the flow of treated gas is such that the thermal powers involved remain lower than the possibilities of the heat pipe 2, the latter remains substantially isothermal at the temperature of the ring 8. The treated gas travels through a sinuous path defined by the fins 13 and is progressively cooled to a temperature which is a few degrees high than that of the heat pipe. Owing to this cooling, its component or components which is or are the least volatile practically completely condense on the fins 13 and on the outer surface of the pipe 2, descend in the container 1 under the effect of gravity and are discharged at the lower point of the container through the conduit 6.

This apparatus is cheap to construct and has the important advantage of cooling the gas to be treated exactly at the required temperature level, which gives an excellent yield.

In order to avoid formation on the fins 13 of a liquid film which might interfere with the heat exchange between the gas to be treated and the heat pipe the container 1 may be disposed, by way of a modification, horizontally or with a slight inclination to the horizontal. This also affords the advantage of reducing the required quantity of diphase fluid for guaranteeing a good wetting of the whole of the inner wall of the pipe 2. Whatever be the orientation of this pipe, experience has shown that the direction of circulation of the gas may be reversed.

The apparatus shown in FIG. 1 is used in the case where the trapped components are in the liquid form. The modification shown in FIG. 2 further comprises very simple regeneration means which enable the apparatus to trap also components which solidify, as is the case for the gas dehydration operations.

Indeed, the apparatus shown in FIG. 2 is identical to that of FIG. 1 except for the lower part of the container 1: a second massive copper ring 15 similar to the ring 8 is welded to the lower end of the pipe 2. This ring 15 constitutes an electric resistance which is connected by wires 16 to a source of electric current. The ring 15 is isolated from the container 1 by a horizontal plate 17 and the purge conduit 6 extends from a point located just about this plate.

The apparatus shown in FIG. 2 operates in the same way as that described hereinbefore with reference to FIG. 1, except that the purification of the treated gas results in the formation of a solid deposit, in particular ice, on the pipe 2 and on the fins 13. After a certain operating time, the valves of the conduits 4 and 5 and the electrically operated valve 11 are closed and the ring 15 is supplied with current. The heat pipe 2 then operates as a heat transfer means in the upward direction which rapidly heats the whole of the pipe 2 and its fins. When the temperature rises beyond 0° C., the ice melts and flows under the effect of gravity to the bottom of the container 1. The water thus collected is purged through the conduit 6. After this regeneration operation, the apparatus is ready to effect a new purification-regeneration cycle.

It will be understood that, in practice, two apparatus of this type may be coupled, one effecting the purification of the gas to be treated while the other regenerates by heating.

As before, the direction of circulation of the gas may be reversed and the axis of the pipe 2 may be disposed at least roughly horizontally. In the latter case, the heating means may be disposed at the same end as the ring 8 and combined with the latter. For example, de-icing could be achieved by circulating a hot fluid in the coiled tube 9. In fact, heating means may be provided at any point of the heat pipe in this case.

The apparatus shown in FIG. 3 is adapted to recover in the liquid form a solvent contained in a small amount in a gas current. In this FIG. 3, the same reference numerals are employed for designating the elements corresponding to those shown in FIGS. 1 and 2, but with the addition of the suffix "A".

The apparatus shown in FIG. 3 comprises mainly a U-shaped container 1A, heat insulated, an isothermal device 8A for affording the required cooled, and a device 18 for recovering the cold.

The container 1A has two vertical sections, namely an inlet conduit 19 connected to a supply conduit 4A, and an outlet conduit 20 connected to a discharge conduit 5A. The conduits 19 and 20 have a common vertical wall 21.

This container is provided in its lower part in the conduits 19 and 20 with a series of parallel vertical plates 22; a purge conduit 6A provided with a valve extends from the lower point of the container 1A.

Between the lower end of the plates 22 and a point located above the latter, the insulation of the outer wall of the inlet conduit 19 is eliminated, and above the plates 22 this wall part has extending therethrough a plurality of layers of heat pipes 2A each constituted by a finned horizontal or roughly horizontal metal pipe. These pipes are all parallel to each other and extend by their condenser 7A outside the conduit 19 into a thermally insulated chamber 23 connected to this conduit.

The chamber 23, which constitutes the isothermal device 8A, contains, in addition to the projecting part of the heat pipes 2A, a fan 24 driven by a motor 25, deflectors 26 and a liquid nitrogen spraying system 27 connected to a supply conduit 10A. The latter is provided with an electrically operated valve 11A controlled by a probe 12A which measures the temperature prevailing in the chamber 22. The wall of this chamber includes a vent 28.

The device 18 for recovering the cold condition comprises a series of layers of heat pipes 29 disposed above the heat pipes 2A. These heat pipes 29 are formed by horizontal finned tubes similar to the heat pipes 2A and extending symmetrically through the central wall 21 of the container 1A.

In operation, the system 27 sprays an appropriate amount of liquid nitrogen into the chamber 23 so as to maintain a set or reference temperature which is lower by a few degrees than the solent trapping temperature. This nitrogen is vaporized in the chamber 23 and the gaseous nitrogen thus produced is subjected to a forced circulation through the layers of heat pipes 2A by the fan 24 and the deflectors 26, the excess of gaseous nitrogen being discharged through the vent 28.

When the desired temperature is reached, the gas to be purified is sent through the conduit 4A and the conduit 19. This gas, which was optionally pre-cooled by a suitable device (not shown), passes through the heat pipes 29 than the heat pipes 2A. The latter cool it to the trapping temperature and the solvent is condensed on these pipes and on the plates 22 which perform the function of a phase separator.

The purified gas then rises through the conduit 20 and passes through the heat pipes 29 to which it gives up a part of its cold state which it received from the heat pipes 2A. The heat pipes 29 transfer this cold state to the inlet conduit 19 and thus effect an effective pre-cooling of the entering gas.

The heat pipes 2A and 29 contain a diphase fluid suitable for the considered treatment temperature, for example "Freon R22" or ethylene as before. They may moreover contain a capillary structure which favors the return of the liquid phase to the evaporator, possibly in opposition to the action of gravity, and the correct internal wetting of the evaporator, as is well known in the heat pipe art. As will be understood, the evaporator of the heat pipes 29 is, as the evaporator of the heat pipes 2A, the part of the considered pipes which is located in the inlet conduit 19, while the part of these pipes outside the conduit 19 constitutes the condenser of the heat pipes.

Note that the thermal transfer power of such an apparatus may be easily adapted to needs by constructing the layers of heat pipes in the modular form, as shown in FIG. 3 in respect of the heat pipes 29.

As in the case of FIGS. 1 and 2, the discharge of the condensate can be improved by disposing the apparatus in the "flat" position, optionally with a slight slope. In this case, FIG. 3 would constitute a top plan view with a horizontal section of the apparatus.

The apparatus shown in FIG. 4 is also adapted to trap in the liquid from a solvent contained in a gas current. Its general construction is similar to that of the apparatus shown in FIG. 1, with the following two differences: on one hand, the container 1B contains a plurality of heat pipes 2B which are parallel to one another, on the other hand, these heat pipes have as a source of cold a common isothermal device 8B which replaces the copper ring 8 of FIG. 1.

The device 8B is an auxiliary heat pipe defined by a thermally insulated chamber 30 located above the plate 3B which defines the upper end of the container 1B to be frozen. This chamber 30 contains a diphase fluid suitable for the temperature required to prevail in the container 1B. The upper end 7B of the heat pipes 2B is immersed in the liquid and a nest of tubes 9B provided with transverse fins occupies the upper part of the chamber 30, in the vapor phase. This nest of tubes is fed with liquid nitrogen, as in FIG. 1, through a conduit 10B provided with an electrically operated valve 11B, and the gaseous nitrogen escapes through a conduit 14B. The probe 12B controlling the electrically operated valve 11B can measure either the temperature of the heat pipes 2B in the container 1B, as illustrated, or the temperatures of the auxiliary heat pipe 8B. Further, the horizontal fins 13B are common to all the heat pipes 2B.

In operation, the vaporization of the liquid nitrogen in the nest of tubes 9B brings, then maintains, the heat pipe 8B, and consequently the heat pipes 2B and their fins 13B, at the set or reference temperature. The gas to be purified is made to circulate in the container 1B from the conduit 4B to the conduit 5B along the sinuous path defined by the fins 13B. The heat supplied by the entering gas vaporizes the liquid contained in the heat pipes 2B, and vapor thus formed is transferred to the chamber 30 in vaporizing the liquid contained in this chamber 30 around the condensers 7B of the heat pipes 2B, as illustrated. Simultaneously, the liquid of the chamber 30 condenses the vapor in the heat pipes 2B and the condensed liquid redescends to the base of the heat pipes. The solvent is condensed on the fins 13B and on the heat pipes 2B, collects at the base of the container 1B and is discharged through the purge conduit 6B.

By way of a modification, in each of the foregoing cases, the tubes having transverse fins may be replaced by tubes having longitudinal fins. In the apparatus shown in FIGS. 1, 2 and 4, any suitable type of baffles may be used in the treatment container.

It will be understood that the invention is applicable to the purification of many liquid or gaseous fluids and more generally to the total or partial freezing of a container or of a body at any temperature between ambient temperature and the boiling point of nitrogen, or more generally between the ambient temperature and the temperature at which is supplied the cryogenic agent employed ($CO_2$, oxygen, hydrogen or a liquified rare gas, etc.).

What is claimed is:

1. An apparatus for cooling a region at a set temperature below ambient temperature but substantially above liquid nitrogen boiling temperature, said apparatus comprising at least one sealed heat pipe including an evaporator portion disposed in said region and a condenser portion disposed outside said region, an isothermal device disposed outside said region and in thermal exchange relation with said condenser portion, and means for supplying a regulated current of liquid nitrogen for maintaining said isothermal device substantially at said set temperature, said heat pipe containing a diphasic fluid whose boiling domain extends on either side of said set temperature.

2. An apparatus according to claim 1, wherein said isothermal device is enclosed within a closed space which surrounds said condenser portion of said heat pipe.

3. An apparatus according to claim 1, wherein said isothermal device is a mass of metal which surrounds the condenser portion of the heat pipe and which is itself in heat exchange relationship with a conduit through which the current of liquid nitrogen flows.

4. An apparatus according to claim 3, and a temperature probe which senses the temperature of said mass and controls a valve inserted in a supply conduit for said liquid nitrogen current.

5. An apparatus according to claim 1, wherein said isothermal device comprises a body of liquid in a closed compartment, said condenser portion of said at least one pipe being immersed in said body of liquid, said means for supplying liquid nitrogen comprising a condenser in said closed compartment above said body of liquid, said liquid nitrogen flowing through said condenser in indirect heat exchange with vapor above said body of liquid.

6. An apparatus according to claim 1, wherein the isothermal device is a chamber which surrounds the condenser portion of the heat pipe and which includes means for spraying liquid nitrogen into said chamber and means for subjecting the gaseous fluid thereby obtained to a forced circulation within said chamber, the apparatus further comprising a temperature probe which senses the temperature of said chamber and controls a valve inserted in the liquid nitrogen supply pipe.

7. An apparatus according to claim 1, wherein the isothermal device is formed by an auxiliary heat pipe having an evaporator which surrounds the condenser portion of the first-mentioned heat pipe and a condenser which contains a heat exchanger through which the liquid nitrogen current flows.

8. An apparatus according to claim 1, comprising a plurality of said heat pipes the evaporator portions of which are disposed in said region, said isothermal device being common to all said heat pipes.

9. A cooling trap for a mixture of fluids, said trap comprising a container, means for circulating said mixture through said container from an inlet to an outlet thereof, and an apparatus for cooling said container at a set temperature below ambient temperature but substantially above liquid nitrogen boiling temperature, said apparatus comprising at least one sealed heat pipe including an evaporator portion disposed in said container and a condenser portion disposed outside said container, an isothermal device disposed outside said region and in thermal exchange relation with said condenser portion, and means for supplying a regulated current of liquid nitrogen for maintaining said isothermal device at said set temperature, said heat pipe containing a diphasic fluid having a boiling domain which extends on either side of said set temperature.

10. A trap according to claim 9, wherein said container has an elongated shape and said evaporator portion of said heat pipe is formed by a tube which extends inside and throughout the length of said container.

11. A trap according to claim 9, comprising heating means for said heat pipe.

12. A trap according to claim 11, wherein said fins are transverse to an axis of said tube, which axis makes an angle with the vertical.

13. A trap according to claim 9, wherein said container includes baffles formed by fins connected to said heat pipe.

14. A trap according to claim 9, wherein said container has a U-shape and in which secondary heat pipes for cold recovery are mounted, the evaporator portions thereof being disposed in the inlet chamber for said mixture to be treated of said U-shaped container and the condenser portions thereof being disposed in the outlet chamber of said container.

* * * * *